Patented July 1, 1947

2,423,291

UNITED STATES PATENT OFFICE 2,423,291

TREATMENT OF ORGANIC THIOCYANATES

Joseph N. Borglin, Wilmington, Del., assignor to Hercules Powder Company, Wilmington, Del., a corporation of Delaware No Drawing. Application July 3, 1943, Serial No. 493,424

7 Claims. (Cl. 260—454)

This invention relates to a process for removing the undesirable odor-producing compounds from organic thiocyanates, and more particularly relates to selective solvent removal of the odor-producing compounds with a solvent capable of immiscibility with a hydrocarbon solution of the thiocyanates, in an amount sufficient to remove the odor compounds and a minimum amount of the thiocyanates.

Organic thiocyanates, selenocyanates, and tellurocyanates, hereinafter to be conveniently referred to as organic cyanates, are, in general highly toxic to insects. Hence, they are useful as active agents in contact insecticides such as household flysprays. However, they suffer from the disadvantage that they are accompanied by a rather unpleasant odor of the sulfurous or mercaptan type. It has been understood in the art that the odor of these organic cyanates is inherent and that separation of the odor-producing compounds would be impossible on a selective solvent solubility basis. However, it has been discovered that the odor-producing compounds present in these organic cyanates are chemical entities separate and distinct from the organic cyanates and are removable from these organic cyanates by means of a liquid material having a selective solvent action toward the odor-producing compounds, when the liquid material is used in an amount sufficient to remove substantially all of the odorous compounds and at the same time remove a minimum amount of the organic cyanates.

The method in accordance with this invention is illustrated by the following specific examples, all parts and percentages being by weight unless otherwise specified:

Example 1

Twenty-five parts of technical secondary hexyl isothiocyanate were dissolved in 100 parts of petroleum ether. The resulting solution was agitated with 80 parts of a 50% solution of sodium iodide in ethyl alcohol. The resulting mixture was allowed to separate into two phases. The lower layer of sodium iodide containing the odor-producing compounds originally contained in the technical cyanate was separated from the cyanate phase from which the unpleasant odors had been removed. The ratio of selective solvent used and cyanate treated was 3.2. The petroleum ether solution of treated cyanate was subjected to vacuum distillation to eliminate the volatile solvent. The amount of cyanate recovered was 87%. The treated cyanate had a desirable odor as contrasted to the undesirable odor before treatment.

Example 2

Twenty-five parts of phenyl isothiocyanate were dissolved in 100 parts of petroleum ether. Freshly distilled furfural was then added to this solution until saturation occurred. This required two parts of furfural. Seven additional parts of furfural were then added and the mixture vigorously agitated. The resulting mixture was allowed to separate into two liquid layers. A yellow-brownish bottom layer was removed. The top layer containing the treated cyanate was washed three times with water using 100 parts for each wash. The volatile solvent was removed by vacuum distillation. 90% of treated cyanate was recovered. The recovered cyanate possessed a desirable odor in contrast to the undesirable odor present before treatment. The ratio of selective solvent used to cyanate treated was .36.

Example 3

One hundred parts of a mixture of bornyl and fenchyl thiocyanoacetates, 240 parts of petroleum ether, and 100 parts of aqueous phenol (85% phenol) were brought into intimate contact with each other. The resulting mixture was then allowed to separate into two phases. The bottom layer representing the extractant phase was removed. A portion of the top layer was subjected to vacuum distillation to remove volatile solvent from the treated cyanate mixture. 89% of treated cyanate was recovered having a desirable odor as contrasted to the undesirable odor present before treatment. The ratio of selective solvent used to cyanate treated was .85.

Example 4

A technical mixture consisting of about 35 parts of beta-thiocyanoethyl laurate, about 15 parts of beta-butyloxy-beta'-thiocyanodiethyl ether, and about 50 parts of kerosene was mixed with 100 parts of petroleum ether. This mixture was then cooled to a temperature of about 3° C. To the chilled mixture there were added 80 parts of tetrahydrofurfuryl alcohol containing 16.5% water, the tetrahydrofurfuryl alcohol also being at 3° C. The resulting mixture was vigorously agitated and then allowed to stand at 3° C. until separation into two layers took place. The heavier bottom layer (about 70 parts) was drawn off, and the remaining solution was then extracted three times at 3° C., each time using 17 parts of tetrahydrofurfuryl alcohol having the water content mentioned. The liquid remaining after these extractions was then washed three times with water using 100 to 150 parts for each wash. The washed solution was then filtered and subjected to distillation, first at atmospheric pressure and then at reduced pressure to remove petroleum ether present. 84% of treated cyanate was recovered having a desirable odor as contrasted to the undesirable odor present before treatment. The ratio of selective solvent used to cyanate treated was 1.3.

Example 5

Fifty parts of technical lauryl thiocyanate were dissolved in 150 parts of petroleum ether. The solution was cooled to about 3° C. and vigorously agitated with a similarly cooled mixture consisting of 18 parts of tetrahydrofurfuryl alcohol, 13 parts of methanol, and two parts of water. The resulting mixture was allowed to stand at 3° C. until separation into two layers occurred. The heavier layer was removed. The remaining solution was treated at about 3° C. with a mixture consisting of nine parts of tetrahydrofurfuryl alcohol, 6.5 parts of methanol, and one part of water in the manner of the first treatment. The resulting treated solution was then washed four times with water using about 100 parts of water for each wash, and it was then subjected to distillation at reduced pressure to eliminate volatile solvent. 68% of treated cyanate was recovered having a desirable odor as contrasted to the undesirable odor present before treatment. The ratio of selective solvent used to cyanate treated was 1.0.

Example 6

Fifty parts of technical lauryl thiocyanate were dissolved in 150 parts of petroleum ether, and to this solution there were added 52 parts of aniline. The resulting mixture was cooled by means of a dry ice-acetone bath until a crystal cake began to form. The mixture was then removed from the bath and the crystal cake permitted to melt at which point separation of the two layers was observed and the heavier layer was immediately removed. Four parts of fresh aniline were then added to the remaining solution, and separation repeated as described immediately above. The extracted solution was then washed with dilute sulfuric acid and water until all aniline and residual acid were eliminated. Volatile solvent was then removed by distillation and reduced pressure. 86% of treated cyanate was recovered having a desirable odor as contrasted to the undesirable odor present before treatment. The ratio of selective solvent used to cyanate treated was 1.1.

Example 7

Fifty parts of a mixture of bornyl and fenchyl thiocyanoacetates were mixed with 150 parts of petroleum ether and treated with 15 parts of 2-nitro-2-methyl-1-propanol until substantially all of the crystals of the nitro alcohol were dissolved. The mixture was permitted to stand until two layers separated, after which the heavier layer was drawn off. The remaining solution was treated in a similar manner after the addition of two parts of fresh nitro alcohol. The treated solution was then washed four times with water using about 100 parts of water for each treatment. The water washed solution was then subjected to distillation at reduced pressure to remove volatile solvent. 80% of treated cyanate was recovered having a desirable odor as contrasted to the undesirable odor present before treatment. The ratio of selective solvent used to cyanate treated was .34.

Example 8

Fifty parts of a technical mixture of bornyl and fenchyl thiocyanoacetates were dissolved in 150 parts of petroleum ether and treated with nine parts of 2-nitro-2-methyl-1,3-propanediol and 14 parts of methanol. After intimate contact of the components of the resulting mixture separation into two layers was permitted, the heavier layer being drawn off and the remaining layer being again treated in a similar manner using a solution consisting of two parts of the 2-nitro-2-methyl-1,3-propanediol and 3.2 parts of methanol. Separation was again made and the extracted solution was washed four times with water using 100 parts for each wash. The water washed solution was then subjected to distillation at reduced pressure to remove volatile solvent. 74% of treated cyanate was recovered having a desirable odor as contrasted to the undesirable odor present before treatment. The ratio of selective solvent used to cyanate treated was .57.

Example 9

A solution of cyanate was prepared by mixing 100 parts of a crude cyanate product consisting of about 50% beta-butyloxy-beta'-thiocyanodiethyl ether and about 50% kerosene with 150 parts of petroleum ether. This solution was agitated with 18 parts of a treating liquid having a composition of 63.75% phenol, 11.25% water, and 25% methanol. The resulting mixture was permitted to stand until separation into two layers occurred. The heavier layer was removed. The remaining solution was then treated in a similar manner upon the addition of two parts of fresh treating liquid. The treated solution remaining after removal of the heavier layer was subjected to distillation at atmospheric pressure to remove the petroleum ether. The resulting solution was then steam distilled at reduced pressure to remove residual phenol. 77% of treated cyanate was recovered having a desirable odor as contrasted to the undesirable odor present before treatment. The ratio of selective solvent used to thiocyanate treated was .2.

Example 10

Fifty parts of a crude mixture of bornyl and fenchyl thiocyanoacetates were dissolved in 150 parts of petroleum ether and treated with ten parts of a 25% methanol solution of resorcinol. The mixture was permitted to stand until separation into two layers occurred, of which the heavier layer was removed. Treatment was repeated using an additional three parts of fresh treating solution and removing the heavier layer after separation. The treated solution remaining was then washed four times with water using 150 parts for each wash. The water washed solution was then subjected to distillation at reduced pressure to remove the petroleum ether. 82% of treated cyanate was recovered having a pleasant odor as contrasted to the unpleasant odor before treatment. The ratio of selective solvent used to cyanate treated was .26.

The organic cyanates which may be improved in accordance with the method of this invention may be any stable organic thiocyanate, organic selenocyanate, and organic tellurocyanate. Such cyanates may be aliphatic, aromatic, alicyclic, heterocyclic, etc., and they may be hydrocarbon cyanates or they may be cyanates of organic groups which contain oxygen, nitrogen, sulfur, chlorine, bromine, etc. The method of this invention may, for example, be applied to organic cyanates such as hexyl thiocyanate, cyclohexyl thiocyanate, stearyl thiocyanate, oleyl thiocyanate, lauryl thiocyanate, terpinyl thiocyanate, bornyl thiocyanate, fenchyl thiocyanate, isobornyl thiocyanate, cyclohexyl thiocyanate, methylcyclohexyl thiocyanate, hexyl thiocyanoacetate, cyclohexyl thiocyanoacetate, octyl thiocyanoacetate, octyl thiocyanopropionate, terpinyl thiocyanoacetate, bornyl thiocyanoacetate, fenchyl thiocyanoacetate, terpinyl thiocyanopropionate, terpinyl thiocyanobutyrate, beta-thiocyanoethyl propionate, beta-thiocyanoethyl thiocyanoacetate, beta-thiocyanoethyl laurate, beta-thiocyanoethyl stearate, beta-thiocyanoethyl benzoate, butyloxyethyl thiocyanate, butyloxyethyl thiocyanoacetate, beta-butyloxy-beta'-thiocyanodiethyl ether, glycerol thiocyanate distearate, benzyl thiocyanoacetate, styrol dithiocyanoacetate, glycol dithiocyanoacetate, diphenylamine dithiocyanate, furfuryl thiocyanoacetate, etc.

Similarly, the method in accordance with this invention may be utilized to improve the odor of cyanates such as amyl isothiocyanate, hexyl isothiocyanate, cyclohexyl isothiocyanate, secondary hexyl isothiocyanate, cyclohexyl isothiocyanoacetate, phenyl isothiocyanate, bornyl isothiocyanate, fenchyl isothiocyanate, terpinyl isothiocyanopropionate, lauryl isothiocyanate, beta-butyloxy-beta'-isothiocyanodiethyl ether, beta-butyloxyethyl isothiocyanate, and other isothiocyanates of the character of the normal thiocyanates mentioned. The isothiocyanates are in general similar to the normal thiocyanates in containing undesired odorous by-products or decomposition products. Thus, wherever "thiocyanates" or "thiocyano-" compounds are referred to herein and in the claims, it will be understood that the term is used in the broad sense to include both normal thiocyanates and isothiocyanates and mixtures thereof, i. e., all organic compounds having an (SCN) or (NCS) group attached to a carbon atom, regardless of the atomic arrangement within the group.

The method of this invention finds its greatest use in connection with improvement of organic thiocyanates, including isothiocyanates. However, it is within the scope of this invention to improve the odor of organic tellurocyanates and organic selenocyanates of a character similar to the organic thiocyanates hereinbefore described in the same manner. The terms "tellurocyanate" and "selenocyanate" are used herein and in the claims in their broad sense which includes the isotellurocyanates and isoselenocyanates respectively.

It has been discovered that a relatively large group of selective solvents may be used in accordance with this invention. It has been discovered that this group of selective solvents operates when used in a certain amount depending upon the kind of cyanate being treated, the diluent being used for the cyanate being treated, the amount of cyanate present in the diluent, the temperature at which the treatment is being carried out, and the manner in which the treatment is being made, i. e., by means of a batch process or by means of a continuous process, to produce a cyanate having a pleasant odor as contrasted to the unpleasant odor present before treatment, while at the same time removing a minimum amount of the desirable cyanate or not more than about 32% of the cyanate. It further has been discovered that this particular group of selective solvents will function properly when a hydrocarbon solvent for the cyanate is used, and the operating efficiency of this group of selective solvents is increased in accordance with an increase in the amount of cyanate solvent present. Generally, the amount of cyanate solvent present may be from between about 5% and about 99% of the cyanate and preferably is between about 65% and about 95% of the cyanate present. In all cases the selective solvent must be capable of immiscibility with the hydrocarbon solution of cyanate being treated. A number of substances which will operate to produce the desirable results described and which has the characteristics necessary in order to produce these desirable results is, for example, phenolic substances, such as phenol, orthocresol, methacresol, paracresol, commercial cresylic acids, resorcinol, 85-15 phenol-water (aqueous phenol being preferred to anhydrous phenol); furfuryl derivatives such as furfural, furfuryl alcohol, tetrahydrofurfuryl alcohol, furfural saturated with water (aqueous furfuryl alcohol being preferred to anhydrous furfuryl alcohol); aniline; methanol, 80-20 methanol-water; liquid sulfur dioxide, $SO_2$-acetone mixtures, $SO_2$-methanol mixtures, $SO_2$-ethanol mixtures, methanol substantially saturated with sodium iodide, ethanol substantially saturated with sodium iodide, methanol substantially saturated with potassium iodide, ethanol substantially saturated with potassium iodide, nitromethane, alcoholic solution of oxalic acid, etc. Extractant compounds solid at ordinary room temperatures may be used in the molten state or they may be rendered liquid by the presence or addition of water, methanol, water-methanol mixtures and the like, whereupon they become effective as liquid extractants.

The inclusion of a limited amount of water in the extractant is frequently desirable. Water acts in most cases to render the extractant more immiscible with the thiocyanate phase. In general, it will be used in a proportion less than about 50%, preferably less than about 25%, by weight of the extractant. Water itself, or an aqueous solution chiefly consisting of water, is not an extractant for odorous compounds normally accompanying organic thiocyanates according to the method of this invention. Water may be used to remove water-soluble salts, acids, and other materials which might cause instability if left with an organic thiocyanate, but water does not remove sulfurous or mercaptanic odors to any appreciable extent.

Suitable hydrocarbon solvents in which the cyanate is dissolved or found associated with before or during treatment with the selective solvent are liquid propane, liquid butane, liquid isobutane, normal pentane, isopentane, tetramethylmethane, normal hexane, isohexane, heptane, octane, petroleum ether, gasoline, deodorized kerosene, and the like, petroleum hydrocarbons being in general eminently suitable; other suitable cyanate solvents are cyclohexane, cyclohexene, pinene, dipentene, paramenthane, or other solvent of the character mentioned. It has been found that the use of such solvents for the thiocyanate improves the efficiency of the deodorizing treatment and improves or actually brings about the necessary immiscibility between the thiocyanate and the odor removing agent. It will be appreciated that the solvent utilized preferably will have minimum solvent action upon both the deodorizing agent employed and the odorous impurities associated with the organic thiocyanate being purified.

Occasionally it will be found that the extractive agent and the thiocyanate phase do not separate readily. This difficulty is readily remedied by the addition of more extracting agent or by the addition of solvent for the organic thiocyanate. Upon stirring in the additional material and allowing the mixture to stand, a separation into two phases will then be readily obtained.

The method according to this invention may be carried out at any temperature within the range between about −60° C. and about 100° C., preferably between about 0° C. and 40° C. The temperature will be chosen for convenience but will be such that the extractant phase is liquid and is substantially immiscible with the organic thiocyanate phase. It is to be noted that an extracting agent may be entirely miscible with the thiocyanate phase at certain temperatures but still be capable of immiscibility therewith, i. e., be immiscible at some other temperature. Thus, an extracting agent may dissolve in the thiocyanate phase at 25° C., but separate out as an immiscible second phase taking up odor-forming impurities upon the system being cooled, for example, to 0° C.

The treatment of the organic thiocyanate with the deodorizing agent may be repeated. In fact, maximum efficiency of deodorization of the organic thiocyanate with a given quantity of deodorizing agent is obtained when the deodorizing agent is divided into portions utilized in a plurality of extractive treatments.

The preferred manner of treating the cyanate with a selective solvent is by means of a continuous process wherein the selective solvent is continuously fed into the upper portion of a suitable tower having a suitable packing means, and into the bottom portion of which is continuously fed the cyanate to be treated, the treated cyanate being continuously taken out from the top and the spent selective solvent being continuously taken off at the bottom. When operating in this manner as contrasted to the batch single pass method the efficiency of the process is greatly increased.

From the foregoing description it is apparent that a novel process has been discovered for the removal of undesirable odor-producing compounds from organic cyanates which comprises contacting a hydrocarbon solution of the cyanates with a liquid having a selective solvent action for the odorous compounds and being capable of immiscibility with the solution, in an amount sufficient to remove substantially all of the odorous compound and not more than about 32% of the cyanate being treated.

This application is a continuation-in-part of my copending application, Serial No. 355,035, filed August 31, 1940, for Treatment of organic thiocyanates.

What I claim and desire to protect by Letters Patent is:

1. A process for removing the undesirable odor-producing compounds from a material selected from the group of materials consisting of organic thiocyanates, selenocyanates, and tellurocyanates having an undesirable odorous compound associated therewith, which comprises contacting a hydrocarbon solution of said material with a liquid having a selective solvent action for the odorous compound, and being capable of immiscibility with said solution, in an amount sufficient to remove substantially all of the odorous compound and a minumum amount of said material whereby there results a cyanate containing phase of reduced content of odorous compound and a second phase, and separating the two phases.

2. A process for removing the undesirable odor-producing compounds from a material selected from the group of materials consisting of organic thiocyanates, selenocyanates, and tellurocyanates having an undesirable odorous compound associated therewith, which comprises contacting a hydrocarbon solution of said material with a liquid having a selective solvent action for the odorous compound, and being capable of immiscibility with said solution, in an amount sufficient to remove substantially all of the odorous compound and not more than about 32% by weight of said material whereby there results a cyanate containing phase of reduced content of odorous compound and a second phase, and separating the two phases.

3. A process for removing the undesirable odor-producing compounds from a material selected from the group of materials consisting of organic thiocyanates, selenocyanates, and tellurocyanates having an undesirable odorous compound associated therewith, which comprises contacting a hydrocarbon solution of said material with a phenol having a selective solvent action for the odorous compound, and being capable of immiscibility with said solution, in an amount sufficient to remove substantially all of the odorous compound and not more than about 32% by weight of said material whereby there results a cyanate containing phase of reduced content of odorous compound and a second phase, and separating the two phases.

4. A process for removing the undesirable odor-producing compounds from a material selected from the group of materials consisting of organic thiocyanates, selenocyanates, and tellurocyanates having an undesirable odorous compound associated therewith, which comprises contacting a hydrocarbon solution of said material with phenol, in an amount sufficient to remove substantially all of the odorous compound and not more than about 32% by weight of said material whereby there results a cyanate containing phase of reduced content of odorous compound and a second phenol phase, and separating the two phases.

5. A process for removing the undesirable odor-producing compounds from a material selected from the group of materials consisting of organic thiocyanates, selenocyanates, and tellurocyanates having an undesirable odorous compound associated therewith, which comprises contacting a hydrocarbon solution of said material with furfural, in an amount sufficient to remove substantially all of the odorous compound and not more than about 32% by weight of said material whereby there results a cyanate containing phase of reduced content of odorous compound and a second furfural phase, and separating the two phases.

6. A process for removing the undesirable odor-producing compounds from a hydrocarbon solution of a material selected from the group of materials consisting or organic thiocyanates, selenocyanates, and tellurocyanates having an undesirable odorous compound associated therewith and being present in said solution in an amount between about 1% and about 95% of the total weight of the solution, which comprises contacting said solution of material with a liquid having a selective solvent action for the odorous compound, and being capable of immiscibility with said solution, in an amount sufficient to remove substantially all of the odorous compound and not more than about 32% by weight of said material whereby there results a cyanate containing phase of reduced content of odorous compound and a second phase, and separating the two phases.

7. A process for removing the undesirable odor-producing compounds from a hydrocarbon solution of a material selected from the group of materials consisting of organic thiocyanates, selenocyanates, and tellurocyanates having an undesirable odorous compound associated therewith and being present in said solution in an amount between about 5% and about 35% of the total weight of the solution, which comprises contacting said solution of material with a liquid having a selective solvent action for the odorous compound, and being capable of immiscibility with said solution, in an amount sufficient to remove substantially all of the odorous compound and not more than about 32% by weight of said material whereby there results a cyanate containing phase of reduced content of odorous compound and a second phase, and separating the two phases.

JOSEPH N. BORGLIN.

REFERENCES CITED

The following references are of record in the file of this patent:

UNITED STATES PATENTS

| Number | Name | Date |
|---|---|---|
| 1,790,097 | Kaufmann | Jan. 27, 1931 |
| 1,859,399 | Kaufmann | May 24, 1932 |
| 2,077,478 | Hollander | Apr. 20, 1937 |
| 2,097,155 | Groll | Oct. 26, 1937 |
| 2,185,183 | Coleman | Jan. 2, 1940 |
| 2,220,521 | Hester | Nov. 5, 1940 |
| 2,339,050 | Carson | Jan. 11, 1944 |

FOREIGN PATENTS

| Number | Country | Date |
|---|---|---|
| 495,510 | Great Britain | Nov. 15, 1938 |